United States Patent
Kasinoff

(10) Patent No.: US 7,041,915 B2
(45) Date of Patent: May 9, 2006

(54) RANDOM WEIGHT FOOD PRODUCT PRICING SCALE WITH AUTOMATED LOGIN CAPABILITY

(75) Inventor: Harvey A. Kasinoff, Troy, OH (US)

(73) Assignee: Premark FEG L.L.C., Wilmington, DE (US)

( * ) Notice: Subject to any disclaimer, the term of this patent is extended or adjusted under 35 U.S.C. 154(b) by 308 days.

(21) Appl. No.: 10/439,502

(22) Filed: May 16, 2003

(65) Prior Publication Data

US 2004/0226757 A1 Nov. 18, 2004

(51) Int. Cl.
*G06K 15/00* (2006.01)
*G01G 19/22* (2006.01)

(52) U.S. Cl. .............. 177/25.15; 705/16; 705/416; 235/383

(58) Field of Classification Search .. 177/25.11–25.19; 235/7 R, 6, 8–28, 383; 705/16–25, 414–416
See application file for complete search history.

(56) References Cited

U.S. PATENT DOCUMENTS

| | | | |
|---|---|---|---|
| 4,605,080 A | 8/1986 | Lemelson | 177/4 |
| 4,885,571 A | 12/1989 | Pauley et al. | 340/573 |
| 4,952,913 A | 8/1990 | Pauley et al. | 340/573 |
| 4,952,928 A | 8/1990 | Carroll et al. | 340/825.54 |
| 4,961,533 A | 10/1990 | Teller et al. | 177/25.19 |
| 5,204,670 A | 4/1993 | Stinton | 340/825.54 |
| 5,537,102 A | 7/1996 | Pinnow | 340/825.3 |
| 5,635,906 A | 6/1997 | Joseph | 340/572 |
| 5,666,010 A | 9/1997 | Stratiotis | 307/328 |
| 5,763,839 A | 6/1998 | Funahashi et al. | 178/19 |
| 5,852,258 A | 12/1998 | Tribou | 177/126 |
| 5,929,769 A | 7/1999 | Garnault | 340/825.31 |
| 5,929,770 A | 7/1999 | Faita | 340/825.35 |
| 6,073,840 A * | 6/2000 | Marion | 235/381 |
| 6,137,480 A | 10/2000 | Shintani | 345/169 |
| 6,255,951 B1 | 7/2001 | De La Huerga | 340/573.1 |
| 6,314,407 B1 | 11/2001 | Maeno | 705/16 |
| 6,681,989 B1 * | 1/2004 | Bodin | 235/383 |
| 2002/0079367 A1 * | 6/2002 | Montani | |
| 2003/0141116 A1 * | 7/2003 | Nuesch et al. | |

OTHER PUBLICATIONS

Hobart Food Equipment Brochure—Quantum Service Scale System—F-7720 (Nov. 2001)—8 pages.
Atmel Brochure—128-bit Read-only IDIC for RF Identification—e5530—Rev. 4508B-RFID-Feb. 2002—8 pages.
Atmel Brochure—Read/Write Base Station—U2270B—Rev. A6, Nov. 29, 2001—16 pages.
Atmel Brochure—Standard Read/Write Crypto Identification IC—e5561—Rev. A3, Oct. 4, 2000—26 pages.

* cited by examiner

*Primary Examiner*—Randy W. Gibson
(74) *Attorney, Agent, or Firm*—Thompson Hine LLP

(57) ABSTRACT

A scale system, such as a food product scale in a perishables department of a store, includes multiple scale login enabling RF identification units for use by corresponding service personnel, and a scale adapted to identify an acceptable RF identification unit that meets criteria indicative of likelihood of scale use and to perform an automated login operation for the identified RF identification unit.

27 Claims, 2 Drawing Sheets

RANDOM WEIGHT FOOD PRODUCT PRICING SCALE WITH AUTOMATED LOGIN CAPABILITY

TECHNICAL FIELD

The present invention relates generally to scales of the type commonly used in groceries and supermarkets for weighing random weight items in the nature of food products such as meats and produce and, more particularly, to a random weight item scale including an automated login function.

BACKGROUND

It is known in current food product scales to require each service person to manually input (e.g., via input keys) his/her unique code (e.g. a number) in order to login to the scale prior to using the scale to perform an item weigh and label print operation. Such systems create difficulties where the service person makes an error in entering the code. Such systems can also increase the activity required of the service persons in performing their job related tasks. As used herein the term "service person" refers to a person, typically a store employee, who utilizes a scale or scales to weigh and label food products for store customers.

Accordingly, it would be desirable and advantageous to provide a scale and scale system that is adapted to automatically login service persons.

SUMMARY

In one aspect, in a store including a department having a counter with a customer side and a service person side, a scale system includes multiple scale login enabling RF identification units for use by multiple service persons and a scale located atop the counter. The scale includes a weighing station for receiving items to be weighed and having an associated mechanism for producing weight indicative signals when items are placed on the weighing station, a pricing control operable to establish a price for a weighed item based in part upon a weight indicative signal produced for that item, and an RF detection system outputting an RF detection field in proximity to the scale for detecting the presence of RF identification units within the detection field. The RF detection field defines a limited detection range. The scale is adapted to identify a single one of the RF identification units as being associated with a service person likely to next use the scale and to perform an automatic login for the identified RF identification unit, enabling multiple service persons with corresponding RF identification units to repeatedly move back and forth past the scale without causing automatic login until such an identification is made.

In another aspect, in a store including a department having a counter with a customer side and a service person side, a scale system includes multiple RF identification units for use by multiple service persons and a scale located atop the counter and adapted for weighing and pricing random weight items. The scale is also adapted for enabling multiple service persons to utilize the scale where each service person has one of the RF identification units in the form of a wrist-band or other structure located proximate to the service person's hand. The scale includes a weighing station for receiving items to be weighed and having an associated mechanism for producing weight indicative signals when items are placed on the weighing station. An input device is located on the scale and a controller is operatively connected to the input device and the mechanism, the controller operable to establish a price for a weighed item based in part upon a weight indicative signal produced for that item. An RF detection system is incorporated into the scale and outputs an RF detection field in proximity to the input device for detecting the presence of an RF identification unit near the input device. The RF detection field defines a limited detection range of no more than eighteen inches from the input device enabling multiple service persons to repeatedly move back and forth past the scale without having the RF detection system detect their respective RF identification units until a given service person takes an action indicative of an intent to use the scale by moving the hand having the associated RF identification unit near the input device and within the limited detection range of the RF detection field.

In a further aspect, a scale is adapted for weighing and pricing random weight items and for enabling multiple service persons to utilize the scale where each service person has a respective RF identification unit. The scale includes a weighing station for receiving items to be weighed and having an associated mechanism for producing weight indicative signals when items are placed on the weighing station. An input device is located on the scale and a controller is operatively connected to the input device and the mechanism. An RF detection system is incorporated into the scale and outputs an RF detection field in proximity to the scale, the RF detection field defining a limited detection range so as to prevent detection of RF identification units that are around the scale but not within the limited detection range of the RF detection field. The controller is operable in at least one state during which it normally maintains the scale in an idle mode, and the RF detection system is operatively connected with the controller for placing the scale in an operating mode when an acceptable RF identification unit is detected within the limited detection range of the RF detection field, with the operating mode enabling at least one scale function not enabled during the idle mode.

In yet another aspect, a random weight item pricing scale that is adapted for automated login thereto includes a weighing station for receiving items to be weighed and having an associated mechanism for producing weight indicative signals when items are placed on the weighing station. A controller is operatively connected to the mechanism, the controller operable during an item pricing operation to calculate a price based upon weight of the item. An RF detection system is incorporated into the scale for outputting an RF detection field in proximity to the scale, the RF detection field defining a limited detection range. The RF detection system and controller are adapted to identify, from among a plurality of RF identification units in a vicinity of the scale, a particular one of the RF identification units that meets certain criteria indicating a likelihood of scale use and to perform and automatic operator login for the particular RF identification unit.

In still a further aspect, a random weight item pricing scale that is adapted for automated login thereto includes a weighing station for receiving items to be weighed and having an associated mechanism for producing weight indicative signals when items are placed on the weighing station. A controller is operatively connected to the input device and the mechanism, the controller operable during an item pricing operation to calculate a price based upon weight of the item. An RF detection system incorporated into the scale and outputting an RF detection field in proximity to the scale, the RF detection field defining a limited detection range. The RF detection system and controller are adapted to identify, from among a plurality of RF identification units in a vicinity of the scale, a particular one of the RF identification units that meets certain criteria indicating a likelihood of scale use and to perform and automatic operator login for the particular RF identification unit.

DESCRIPTION

Figure 1:
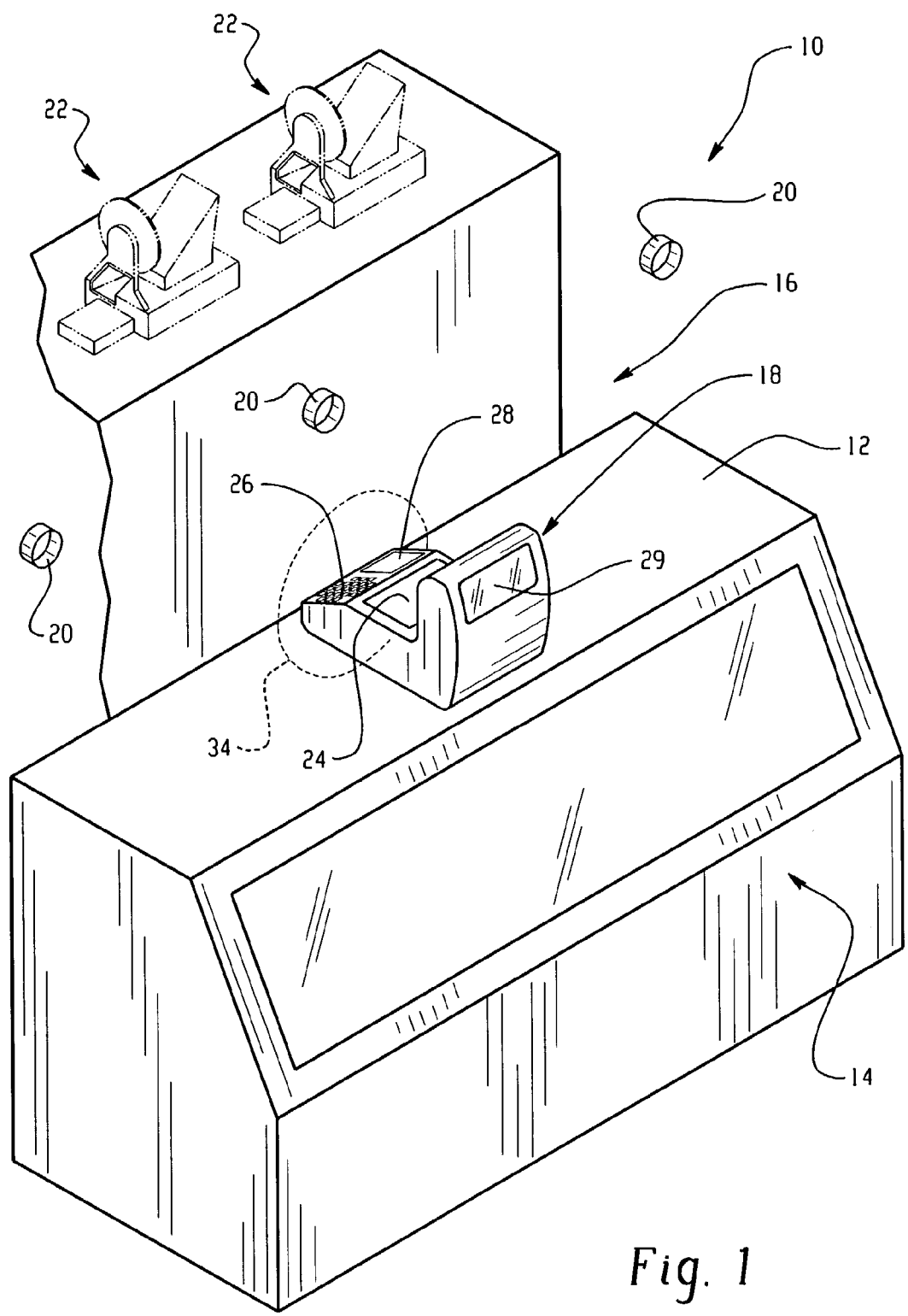
FIG. 1 is a perspective view of an exemplary scale system located within a perishables department of a store.

Referring to FIG. 1, a scale system 10 is shown located in a store perishables department (such as a deli department, meat and fish department or baked goods department) having a counter 12 with a customer side 14 and a service person side 16. The scale system includes a scale 18 located atop the counter 12 and adapted for weighing and pricing random weight items, and multiple RF identification units 20 separate from the scale. In the illustrated embodiment a single scale 18 is shown, but many departments will include multiple scales. Likewise, while a single counter is shown, many departments will include multiple counters arranged adjacent each other to effectively form one continuous counter. In an alternative embodiment may be a hanging scale located above the counter 12. The RF identification units may take the form of wrist-band type units, or other structures, that are worn proximate to the hands of the service persons (not shown). The scale is adapted for enabling multiple service persons to utilize the scale. Typically such multiple service persons move around on the service person side 16 of the counter 12, interacting with customers, slicing food products at slicers 22 and then using the scale or scales 18 to weigh and label the sliced food products.

The scale 18 includes a weighing station 24 for receiving items to be weighed and having an associated mechanism, such as a load cell located internal of the scale housing, for producing weight indicative signals when items are placed on the weighing station 24. The scale 18 also includes an input device 26, which in the illustrated embodiment takes the form of a plurality of input keys or buttons located alongside an operator display screen 28. Also shown is a customer display screen 29. The scale includes a controller 30 (FIG. 2) operatively connected to the input device 26 and the mechanism. The controller is operable to establish a price for a weighed item based in part upon a weight indicative signal produced for that item. In this regard, the scale controller may include its own database of product price information (e.g., price per pound) that it retrieves when the service person inputs a PLU (price look-up) number or other product code of an item being weighed. Alternatively, the scale 18 may include a communication link to a remote computer system having the database of product price information.

The scale 18 includes an RF detection system 32 (FIG. 2) outputting an RF detection field 34 in proximity to the input device 26 for detecting the presence of RF identification units 20 near the input device 26. The RF detection field 34 defines a limited detection range. In one example the detection range may be no more than twelve inches from the input device 26 (such as in the range of six to twelve inches). In another example the detection range may be no more than eighteen inches from the input device 26. The limited detection range enables multiple service persons to repeatedly move back and forth past the scale 18 without having the RF detection system detect their respective RF identification units 20 until a given service person takes an action indicative of an intent to use the scale 18 by moving the hand having the associated RF identification unit 20 toward the input device 26 and within the limited detection range of the RF detection field 34.

In the system 10, the RF identification units may be passive, read only RF identification units 20 that are powered by the RF detection field 34 output by the scale 18. In other words, each RF identification unit includes a coil across which an electrical signal is induced or otherwise developed when it is positioned in the RF detection field. That electrical signal is used to power the unit, causing it to become active when it is within the RF detection field 34. The unit 20 uses an impedance modulation technique to transfer information back to the transmit/receive coil 36 (FIG. 2) of the scale. The information transmitted might typically be a unit specific code or number stored in memory of the unit 20. An example of a suitable RF identification unit that could be used is the e5530 unit available from Atmel in San Jose, Calif. (www.atmel.com), in which case each case each unit comes preprogrammed with a unique code stored in programmable read only memory. The e5530 may typically be used with an RF detection field 34 generated at a frequency between 100 kHz and 450 kHz. It is recognized that wide variations in frequency are possible depending upon the nature of the RF detection unit and the desired detection range, with higher frequencies typically being used to enable grater detection ranges. In one embodiment, the RF detection field 34 is generated at 125 kHz. Once the e5530 is placed in the RF detection field 34 and powered up as a result of the same, it begins transmitting its unique code via impedance modulation which dampens the RF signal of the detection field enabling a demodulator 38 (FIG. 2) to detect the code.

Figure 2:
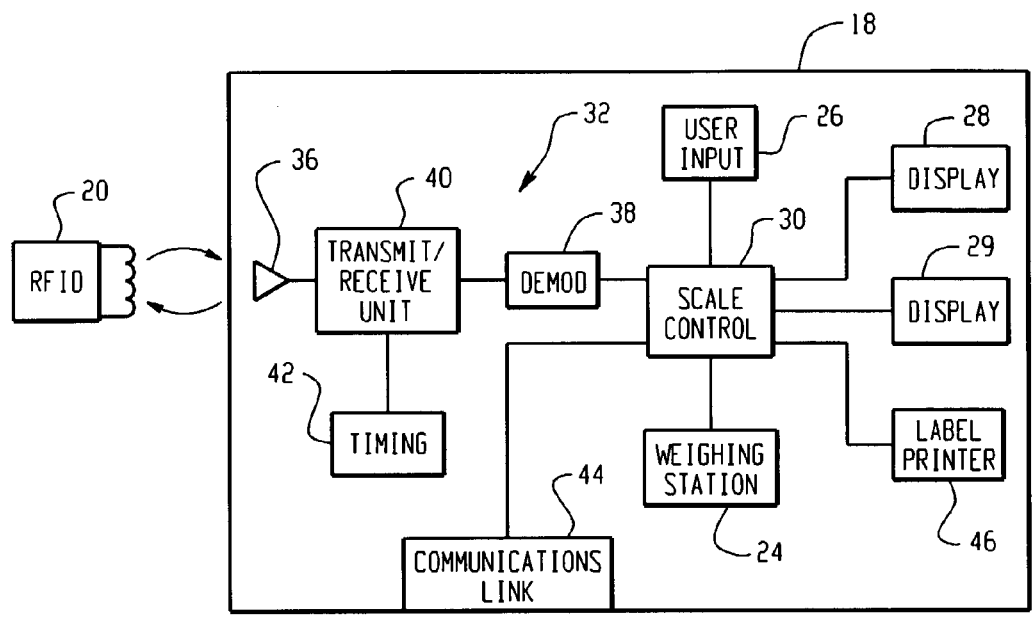
FIG. 2 is a schematic illustration of a scale and RF identification unit.

Referring now to FIG. 2, in one embodiment the RF detection system 32 includes transmit/receive unit 40 associated with transmit/receive coil 36, a timing circuit 42 associated with the unit 40 and a demodulator 38 connected to unit 40. The demodulator identifies RF identification unit codes and sends them to the scale control 30. The scale control 30 may include an internal database of acceptable RFID codes, or may access a remote database of acceptable codes via a communications link 44. The scale control 30 determines of a detected RFID code is acceptable and, if so, automatically performs an operator login operation enabling the service person wearing the RF identification unit with the acceptable code to use the scale for an item weigh and label print transaction. In this regard, the scale 18 includes a label printer 46 as shown, with an associated supply of labels. Of course, the automatic login could enable other scale functions as well. As a general proposition an automatic login operation enables some scale function not enabled prior to the login. It is contemplated that the number and type of functions enabled could be dependent upon the RFID code that results in the login. In other words, different levels of scale functionality could be enabled according to the service person being logged in, where each service person is identified by a unique RFID code. The scale may be considered to be in an idle mode, awaiting login, during non-use periods. After the automatic login the scale is placed in an operating mode. In one example, during the idle mode the scale may be adapted to prevent labels from being printed, while in the operating mode labels can be printed for weighed items.

Figure 3:
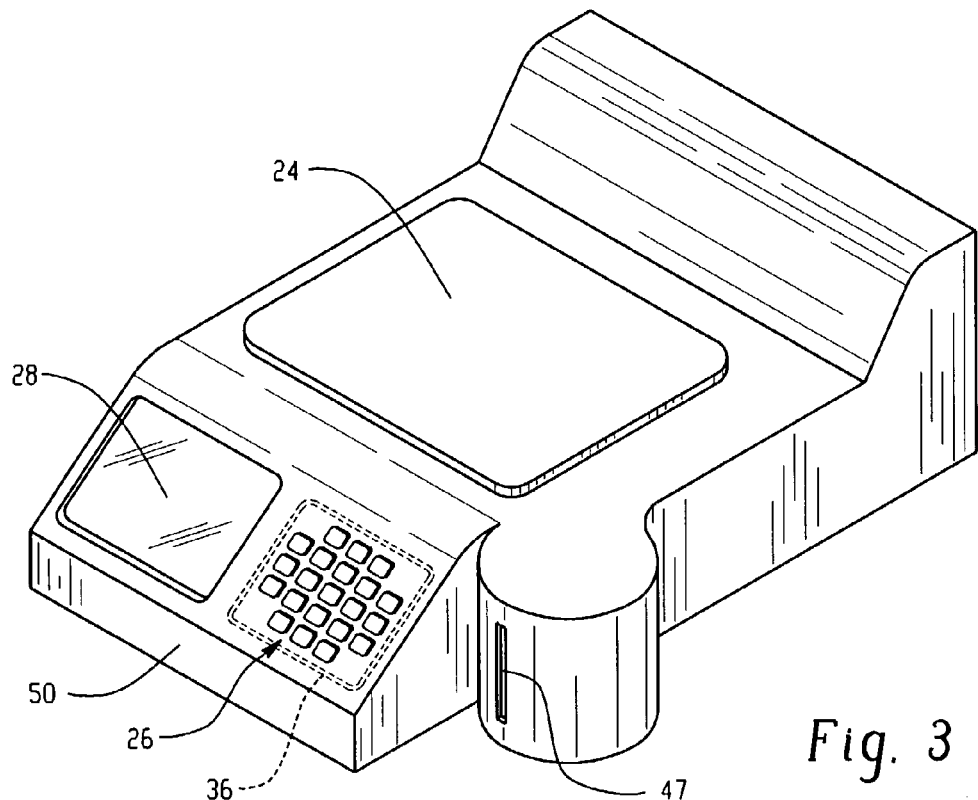
FIG. 3 is a perspective view of one embodiment of a scale.

Referring to FIG. 3, in one contemplated embodiment the transmit/receive coil 36 is located internal of the scale housing and extends about the region in which the user input device 26, or a portion of the user input device, is located. With such an embodiment, the RF detection field can be controlled to have a fairly limited detection range that would normally require a service person wearing an RF identification unit in proximity to his/her hand to move the hand toward or otherwise near the user input device 26 as service persons normally do when they are weighing an item and need to enter the PLU number of the item being weighed. In such cases, the scale control may perform the automatic operator login as soon as an acceptable RF identification unit is detected within the RF detection field 34. Because service persons not intending to use the scale will not normally move their hands into positions proximate to the user input device 26, they will not be logged into the scale 18 even though they might repeatedly move back and forth behind the counter 12 in proximity to the scale 18. FIG. 3 also shows a side located housing part for containing the printing mechanism 46 (FIG. 2), and having an exit slot 47 for labels.

In an alternative embodiment of the scale system, rather than performing the automatic operator login as soon as an acceptable RF identification unit is detected within the RF detection field 34, the scale could be configured to only perform the automatic operator login after an acceptable RF identification unit is detected within the RF detection field for at least a minimum time duration. In one example of such an embodiment the RF identification units may take the form of items worn around the neck as by a chain. In another example the RF identification units may take the form of clip on tags that can be clipped to a shirt collar or shirt pocket. In still another example the RF identification units may simply be held in a shirt, coat or pants pocket. Depending upon the intended location of the RF identification units on the service persons, the range of the RF detection field can be adjusted accordingly. For example, where the RF identification units are worn on a chain around the neck, clipped to a collar or shirt pocket or are simply held in a shirt pocket or coat pocket, the range of the detection field may be slightly greater than arms length, such as in the range of about 1.5 feet to 3 feet, from the scale so that the units are located within the detection field when the service person stands in front of the scale to weigh an item. It is also contemplated that in such embodiments it may be desirable to locate the transmit/receive coil at a most forward location on the scale, such as in region 50 of the scale illustrated in FIG. 3.

Regardless of whether the automatic operator login is performed immediately upon detection of an acceptable RF identification unit within the RF detection field or only after an acceptable RF identification unit is detected within the RF detection field for a minimum time duration, both embodiments provide a scale that is adapted to only perform the login operation in association with an RF identification unit associated with a service person likely to next use the scale. The arrangements therefore avoid logging in of service persons having RF identification units that are not identified as likely to next use the scale, enabling multiple service persons to repeatedly move back and forth past the scale without being logged in until such persons are identified as likely to next use the scale. However, it is recognized that occasionally the automatic login may be performed for a service person that does not actually intend to use the scale at that time. Nevertheless, in the various embodiments the RF detection system and controller are adapted to identify, from among a plurality of RF identification units in a vicinity of the scale, a particular one of the RF identification units that meets certain criteria indicating a likelihood (not necessarily a guarantee) of scale use and to perform and automatic operator login for the particular RF identification unit. In one case the criteria is simple detection of the RF identification unit within a limited range RF detection field, while in another case the criteria is detection of the RF identification unit with an RF detection field for a minimum time duration.

Once an automatic login operation is performed, the scale can track scale activities performed during that login and associate such tracked activities with the RF identification unit that caused the login. For example, the items weighed and labels printed for each RF identification unit can be tracked. The scale may also be adapted to perform an automatic logout operation if a service person does not utilize the scale within a certain time period after the login. Further, an automatic logout may also be performed as soon as a given scale operation is completed, such as an item weigh and label print operation. In one embodiment, once an automatic login operation is performed, the scale control 30 may ignore other RF identification units detected within the RF detection field until a logout takes place, preventing overlapping login operations. In another embodiment, the scale control 30 may have a feedback connection to the RF detection system, disabling the detection system (e.g., stopping output of the RF detection field) while a person is logged into the scale.

Although the invention has been described and illustrated in detail it is to be clearly understood that the same is intended by way of illustration and example only and is not intended to be taken by way of limitation. For example, while the use of passive type RF identification units is described, active, self powered RF identification units could be used in some cases. It is recognized that numerous other variations exist, including both narrowing and broadening variations of the appended claims.

The invention claimed is:

1. In a store including a department having a counter with a customer side and a service person side, a scale system comprising:

multiple scale login enabling RF identification units worn by multiple service persons;

a scale located atop or above the counter and including a first display facing the service person side of the counter, a second display facing the customer side of the counter, a weighing station for receiving items to be weighed and having an associated mechanism for producing weight indicative signals when items are placed on the weighing station, a pricing control operable to establish a price for a weighed item based in part upon a weight indicative signal produced for that item, a label printer for outputting product pricing labels to be applied to food items, an RF detection system outputting an RF detection field in proximity to the scale for detecting the presence of RF identification units within the detection field, the RF detection field defining a limited detection range, wherein the scale is adapted to identify a single one of the RF identification units as being associated with a service person likely to next use the scale and to perform an automatic login for the identified RF identification unit when the service person takes action to weigh a food item and the single one of the RF identification units is moved toward the scale and into the limited detection range of the detection field, enabling multiple service persons with corresponding RF identification units to repeatedly move back and forth past the scale without causing automatic login until such an identification is made, prior to the automated login a product pricing label print function of the scale is disabled, the automated login enables at least the product pricing label print function of the scale permitting the service person to operate the scale to generate a product pricing label.

2. The scale system of claim 1 wherein the limited detection range is no more than twelve inches from the scale.

3. The scale system of claim 1 wherein an RF identification unit is identified as being associated with a service person likely to next use the scale when the RF identification unit is detected within the limited detection range for at least a minimum time duration.

4. The scale system of claim 3 wherein the limited detection range is slightly greater than an arm's length from the scale.

5. The scale system of claim 1 wherein the scale is a first scale and the system further comprises a second scale located atop or above the counter, the second scale including a weighing station, pricing control and RF detection system, the second scale also adapted to identify a single one of the RF identification units as being associated with a service person likely to next use the second scale and to perform an automatic login for the identified RF identification unit.

6. In a store including a department having a counter with a customer side and a service person side, a scale system comprising:

multiple RF identification units worn by multiple service persons;

a scale located atop or above the counter and adapted for weighing and pricing random weight items and for enabling multiple service persons to utilize the scale where each service person has one of the RF identification units in the form of a wrist-band or other structure located proximate to the service person's hand, the scale comprising:
  a weighing station for receiving items to be weighed and having an associated mechanism for producing weight indicative signals when items are placed on the weighing station;
  an input device located on the scale;
  a first display facing the service person side of the counter and a second display facing the customer side of the counter;
  a label printer with associated label supply for printing product pricing labels;
  a controller operatively connected to the input device, the label printer and the mechanism, the controller operable to establish a price for a weighed item based in part upon a weight indicative signal produced for that item; and
  an RF detection system incorporated into the scale and outputting an RF detection field in proximity to the input device for detecting the presence of an RF identification unit near the input device, the RF detection field defining a limited detection range of no more than eighteen inches from the input device enabling multiple service persons to repeatedly move back and forth past the scale without having the RF detection system detect their respective RF identification units until a given service person takes an action indicative of an intent to use the scale by moving the hand having the associated RF identification unit near the input device and within the limited detection range of the RF detection field, the RF detection system is operatively connected with the controller, and the controller is operable to normally maintain the scale in an idle mode in which a product pricing label print function of the scale is disabled, the controller places the scales in an operating mode when an acceptable RF identification unit is detected within the limited detection range if the RF detection field, the product pricing label print function is enabled in the operating mode.

7. The scale system of claim 6 wherein the controller includes memory storing data corresponding to multiple different acceptable RF identification units.

8. The scale system of claim 6 wherein the controller is further operable to track scale actions in association with the acceptable RF identification unit that is detected.

9. The scale system of claim 6 wherein the controller maintains the scale in an operating mode for a limited time period after the RF identification unit is no longer detected in the RF detection field.

10. The scale system of claim 6 wherein the RF identification units are powered by the RF detection field.

11. A scale adapted for weighing and pricing random weight items and for enabling multiple service persons to utilize the scale where each service person has a respective RF identification unit, the scale comprising:
  a weighing station for receiving items to be weighed and having an associated mechanism for producing weight indicative signals when items are placed on the weighing station;
  an input device located on the scale;
  a label printer with supply of labels for printing product pricing labels;
  a first dislay facing one side of the scale, a second display facing an opposite side of the scale;
  a controller operatively connected to the input device, the first display, the second display, the label printer and the mechanism; and
  an RF detection system incorporated into the scale for outputting an RF detection field in proximity to the scale, the RF detection field defining a limited detection range so as to prevent detection of RF identification units that are around the scale but not within the limited detection range of the RF detection field;
  wherein the controller is operable in at least one state during which it normally maintains the scale in an idle mode, and the RF detection system is operatively connected with the controller for placing the scale in an operating mode when an acceptable RF identification unit is detected within the limited detection range of the RF detection field, with the operating mode enabling a product pricing label print function that is not enabled during the idle mode.

12. The scale of claim 11 wherein in the idle mode all scale functions are disabled.

13. The scale of claim 11 wherein the scale includes multiple operating modes with different enabled functions, and the controller sets the operating mode according to the acceptable RF identification unit that is detected.

14. The scale of claim 11 wherein the limited detection range is no more than eighteen inches from the scale.

15. The scale of claim 11 wherein the limited detection range is no more than twelve inches from the scale.

16. The scale of claim 11 wherein the input device comprises a plurality of input keys arranged on a region of the scale and wherein the RF detection system comprises a transmit/receive coil extending around at least a portion of the region.

17. A random weight item pricing scale adapted for automated login thereto, the scale comprising:
   a weighing station for receiving items to be weighed and having an associated mechanism for producing weight indicative signals when items are placed on the weighing station;
   a label printer for printing product pricing labels;
   a controller operatively connected to the mechanism and the label printer, the controller operable during an item pricing operation to calculate a price based upon weight of the item; and
   an RF detection system incorporated into the scale for outputting an RF detection field in proximity to the scale, the RF detection field defining a limited detection range;
   wherein the RF detection system and controller are adapted to identify, from among a plurality of RF identification units in a vicinity of the scale, a particular one of the RF identification units that meets certain criteria indicating a likelihood of scale use and to perform an automatic operator login for the particular RF identification unit; and
   wherein the scale includes an input device in the form of a plurality of input keys arranged on a region of the scale and wherein the RF detection system comprises a transmit/receive coil extending around at least a portion of the region, the limited detection range is no more than twelve inches from the scale.

18. The scale of claim 17 wherein the criteria comprises the particular RF identification unit being within the limited detection range for at least a minimum time duration.

19. The scale of claim 17 wherein the automatic operator login enables at least one scale function not enabled prior to the login.

20. The scale of claim 17 wherein the automatic operator login enables scale functionality according to the particular RF identification unit.

21. The scale of claim 17 wherein when the scale is adapted for tracking at least one type of operation performed by the scale after the automatic operator login.

22. The scale of claim 21 wherein when the scale is adapted to track each weighing operation of the scale in association with the particular RF detection unit that causes the automatic operator login.

23. The scale of claim 17 wherein the scale is adapted to track each label printing operation of the scale in association with the particular RF detection unit that causes the automatic operator login.

24. The scale of claim 17 wherein an operator logout occurs after an item weigh and label print transaction is completed.

25. The scale of claim 17 wherein when the automatic operator login places the scale in a mode during which the presence of another RF identification unit within the limited detection range of the RF detection field will not cause another automatic operator login.

26. The scale of claim 17 wherein the automatic operator login places the scale in a mode during which the RF detection system is disabled.

27. A method of enabling multiple service persons working in the vicinity of a random weight item pricing scale having an automated login function to utilize the scale on an as needed basis, the scale including a associated label printer and a controller for weighing and pricing food items, the method comprising:
   providing each service person with an RF identification unit worn on or near the hand of the service person;
   providing a manual user input device on the scale;
   providing an RF transmit/receive coil that extends about the manual user input device and generating an RF detection field with the transmit/receive coil, the RF detection field having a limited detection range of no more than twelve inches of the scale;
   identifying, from amongst a plurality of RF identification units moving around in a vicinity of the scale, a particular RF identification unit when the hand of the service person having the particular RF identification unit is moved toward the manual user input device and into the limited detection range; and
   performing an automatic scale login operation for the particular RF identification unit that is identified, the automated scale login enabling at least a product pricing label print function of the scale.

* * * * *

UNITED STATES PATENT AND TRADEMARK OFFICE
CERTIFICATE OF CORRECTION

PATENT NO. : 7,041,915 B2 Page 1 of 1
APPLICATION NO. : 10/439502
DATED : May 9, 2006
INVENTOR(S) : Harvey A. Kasinoff It is certified that error appears in the above-identified patent and that said Letters Patent is hereby corrected as shown below:

Col. 8

Line 7 – Change "scales" to -- scale --.

Line 9 – Change "if" to -- of --.

Col. 10

Line 21 – Change "a" before "associated" to -- an --.

Signed and Sealed this

Twenty-second Day of August, 2006

JON W. DUDAS
*Director of the United States Patent and Trademark Office*